United States Patent [19]
Daniels et al.

[11] Patent Number: 5,934,057
[45] Date of Patent: Aug. 10, 1999

[54] CONTINUOUS TINE RAKE

[75] Inventors: Henry Casimir Daniels, Lewisberry; Howard Wallace Andrews, Jr., Hummelstown; Barry Raymond Albert, Dillsburg, all of Pa.

[73] Assignee: True Temper Hardware Company, Camp Hill, Pa.

[21] Appl. No.: 08/936,089

[22] Filed: Sep. 23, 1997

[51] Int. Cl.⁶ ........................................................ A01D 7/06
[52] U.S. Cl. ........................................................ 56/400.21
[58] Field of Search ............................ 56/400.21, 400.16, 56/400.17, 400.2; 460/122

[56] References Cited

U.S. PATENT DOCUMENTS

| | | |
|---|---|---|
| Re. 17,606 | 2/1930 | Withington . |
| D. 264,674 | 6/1982 | Grindlay . |
| 1,610,842 | 12/1926 | Young . |
| 1,706,547 | 3/1929 | Rocquin . |
| 1,959,893 | 5/1934 | Bailie . |
| 2,137,795 | 11/1938 | Bailie . |
| 2,149,429 | 3/1939 | Finkes . |
| 2,205,827 | 6/1940 | Brooke . |
| 2,632,992 | 3/1953 | Wood ................................... 56/400.17 |
| 2,766,577 | 10/1956 | Dorman . |
| 2,883,820 | 4/1959 | Bissell . |
| 3,221,486 | 12/1965 | Godshall et al. . |
| 4,573,311 | 3/1986 | Ipema et al. . |
| 4,733,524 | 3/1988 | Forbes . |
| 5,241,812 | 9/1993 | Crippen . |

*Primary Examiner*—Terry Lee Melius
*Attorney, Agent, or Firm*—Eckert Seamans Cherin & Mellott, LLC

[57] ABSTRACT

A lawn or garden rake for gathering leaves, grass clippings, twigs, etc. has a handle, a socket with retaining elements for fastening to the handle and flaring crimpable retaining elements for retaining a number of continuous paired tines. Each paired tine includes a continuous elongated beam with spaced longitudinal twists of approximately 90° that divide the tine lengthwise into three portions. The tines are stacked tightly and captured in the socket with third portions stacked directly against one another. In this arrangement, the two end portions of each tine fan outwardly from the second end of the socket. A tine positioning spacer is spaced from the socket along the tines and holds their transverse spacing. At least the outer two tines on each side of are spaced more closely than the others to improve load resistance during raking. The rake is assembled in part by driving stacked flat tines into the flaring socket portion, preferably against a stiffening spring, and crimping the socket around the tines and spring to capture them, forming a tight and durable structure.

10 Claims, 6 Drawing Sheets

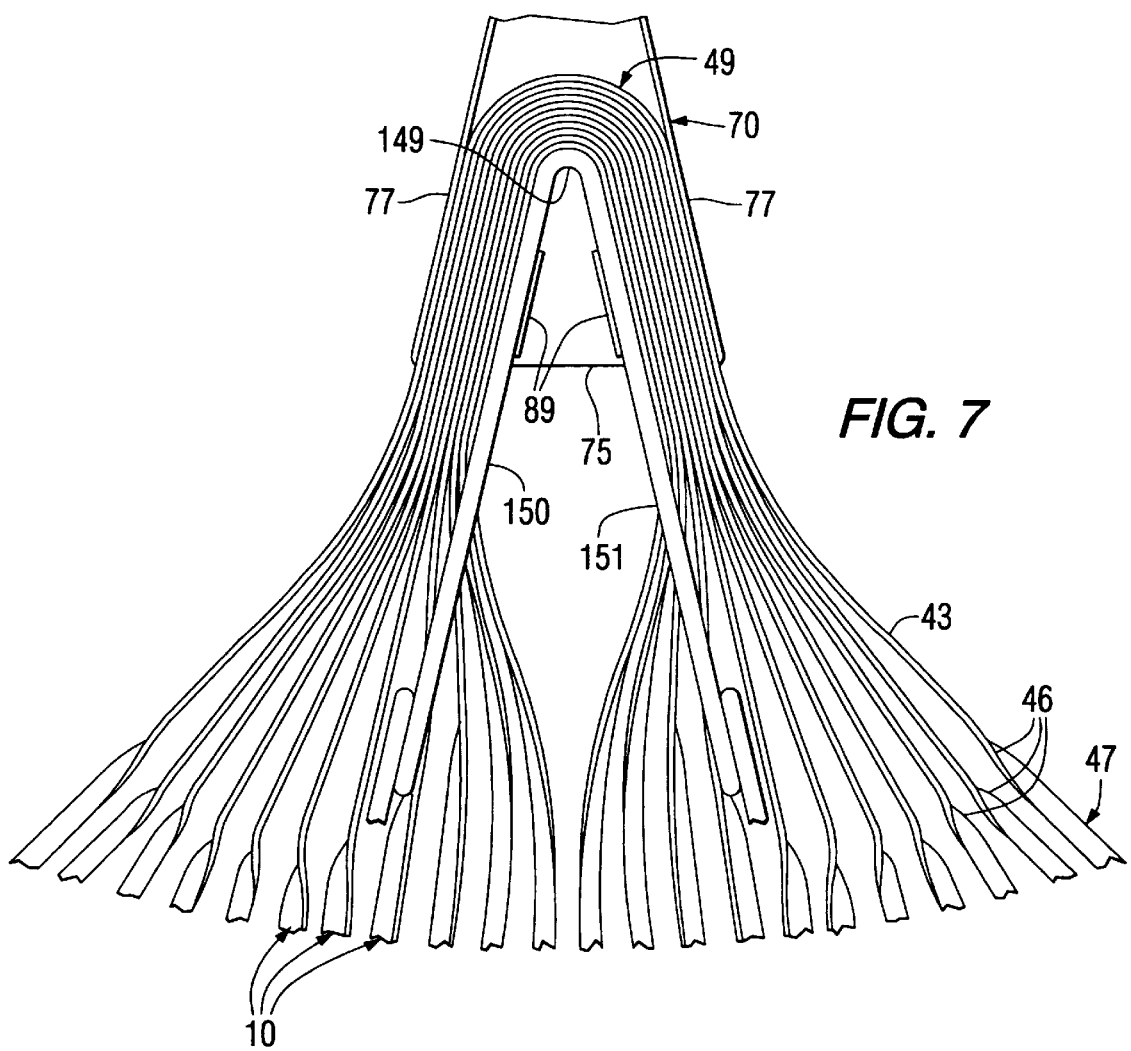
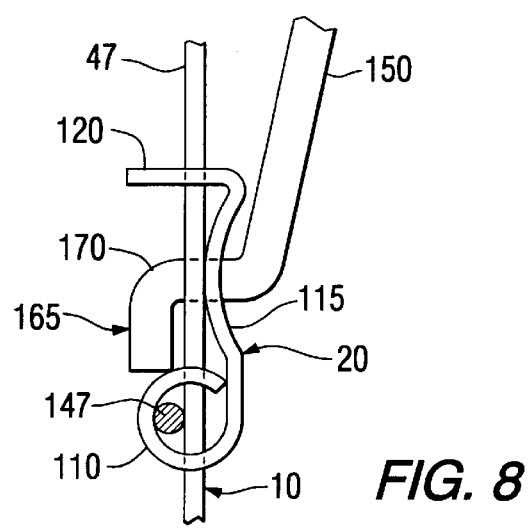

CONTINUOUS TINE RAKE

BACKGROUND OF THE INVENTION

1. Field Of The Invention

The invention relates generally to garden tools and specifically to a rake of the type having flexible metal tines in integral pairs, each tine in a pair forming a continuous strip extending around a bend and held in a tine receptacle affixed to the rake handle.

2. Background Of The Invention

Lawn and garden rakes for gathering leaves, grass clippings, twigs, and the like are known in a number of variations, including rakes having metal strip tines and including integral tines in continuous strips. Some examples are disclosed in U.S. Pat. Nos. 1,610,842—Young; 1,706,547—Rocquin; 1,959,893—Bailie; 2,137,795—Bailie; 2,149,429—Finkes; 2,205,827—Brooke; 2,766,577—Doorman; 2,883,820—Bissell; 3,221,486—Godshall et al.; 4,573,311—Ipema et al.; 4,733,524—Forbes; 5,241,812—Crippen; Re.17,606—Withington; and, Des. 264,674—Grindlay.

Continuous tines are advantageous because it is not possible to disengage a single tine from the tine receptacle, as may occur with tines that are separate individual strips held in place frictionally. U.S. Pat. No. 2,137,795—Bailie, for example, discloses a rake having continuous paired tines. Each pair is formed of an integral strip with a mid-portion disposed in one of a plurality of transverse slots spaced along a ferrule that secures the rake head to the handle. The tine pairs are locked in the slots by a key inserted under the surface of the ferrule. The slots maintain the mid-portions of each tine pair in parallel spaced-relation to one another and separate the tines, which flare out from the slots to form the rake's fan. The individual tines are twisted 90° between the transverse slots and their distal ends to present a broad face at the end portion that engages the ground. That is, the flat strips of the tines reside in a common flat or arched plane at their ends, substantially perpendicular to the direction in which the rake is drawn when in use. In Bailie the tines are twisted at a point that is spaced from the ferrule, adjacent to a spacer that is slotted to engage the flared tines and that maintains a regular spacing between the tines. The tines are locked in the spacer by an inserted retention member in a manner similar to the ferrule slots and key. A bilateral stiffening spring is fastened to the ferrule at a base of the spring and has free ends that are looped around the spacer.

In U.S. Pat. No. 2,149,429—Finkes, a plurality of continuous tines are stacked against one another and clasped in a flaring ferrule that secures the fan of tines to a handle above the end of the handle. Each of the tine pairs is bent around a radius at its mid-point, the inner pairs of tines requiring a sharper bend that the outer pairs. Each tine has a 90° twist adjacent to its exit from the ferrule to present a broad surface for raking, this twist causing the tines to overlap one another in the limited width near the ferrule. The ferrule comprises a pair of ears that are bent inwardly to wrap around the flaring tines, and a pair of prongs that project from the side of the ferrule and are bent over to clasp around the tines at their stacked midpoints. Prior art rakes of this type can suffer from loosening of the tines with use, due to the inability of the prongs and ears to withstand stresses applied to them when raking.

The rake of U.S. Pat. No. 2,205,827—Brooke has separate individual tines projecting outwardly from a spring base to form a fan. The inner tines are flat strips for gathering leaves, grass, twigs, etc. Outer tines on each side comprise a pair of round wires that are clamped together. The outer wires are described as claws, and clamping them together is considered to improve the user's ability to remove material from narrow recesses and corners while raking.

In U.S. Pat. No. 4,573,311—Ipema et al., a lawn rake is provided with an improved means for containing the tines. The tines in that case are locked in a spreader bar of the type which normally simply maintained regular spacing of the adjacent tines. Additionally, the tines are anchored in the rake ferrule or socket portion by means of a spring clip which coacts with a stiffener spring that engages the spreader bar. These aspects enhance the stability of the tine locations, including when raking.

The foregoing rake structures hold the tines of rakes securely. However, manufacturing considerations such as ease of assembly are also pertinent, as are considerations of cost. There has been a need for a continuous tine rake that provides for easy and cost effective construction during manufacturing and further provides improved distribution of raking loads on the tines and outer tine strength and cooperation.

SUMMARY OF THE INVENTION

The invention provides a rake comprising a handle, a socket having means for retaining the handle at a first end and crimpable means for retaining a plurality of continuous paired tines at a second end. Each pair of tines comprises a continuous elongated beam or strip with two longitudinally spaced twists that divide each tine lengthwise into three portions. Two end portions of each tine pair are twisted approximately 90° with respect to a centrally disposed third portion, which is bent around a radius. The tines are arranged in the second end of the socket with the third portions stacked one atop the other in abutting relation. In this arrangement, the two end portions of each tine extend radially-outwardly from the second end of the socket.

A tine spacer is spaced from the socket and is coupled to the tines to space and hold the two end portions of each tine pair, forming a fan of tines. At least the outermost two tines of the fan are placed closer to one another than the inner tines, to improve resistance to breakage and to more evenly distribute the load during raking. The fan of tines is stiffened, for example, by a stiffening spring engaging between the socket and the spacer.

BIEF DESCRIPTION OF THE DRAWINGS

These and other objects, features and advantages of the invention will be appreciated from the following detailed description of a preferred embodiment of the invention, which is to be considered together with the accompanying drawings wherein like numbers refer to like parts and further wherein:

FIG. 7 is similar to FIG. 5, but with the crimp wings and side walls of the socket shown as transparent for clarity of illustration;

FIG. 8 is an enlarged side view of the portion of the rake shown in FIG. 2 that is enclosed by the rectangular dotted box "A"; and, FIG. 9 is a rear elevational view of the tine spacer shown in FIG. 1.

DETAILED OF THE PREFERRED EMBODIMENT

Figure 1:
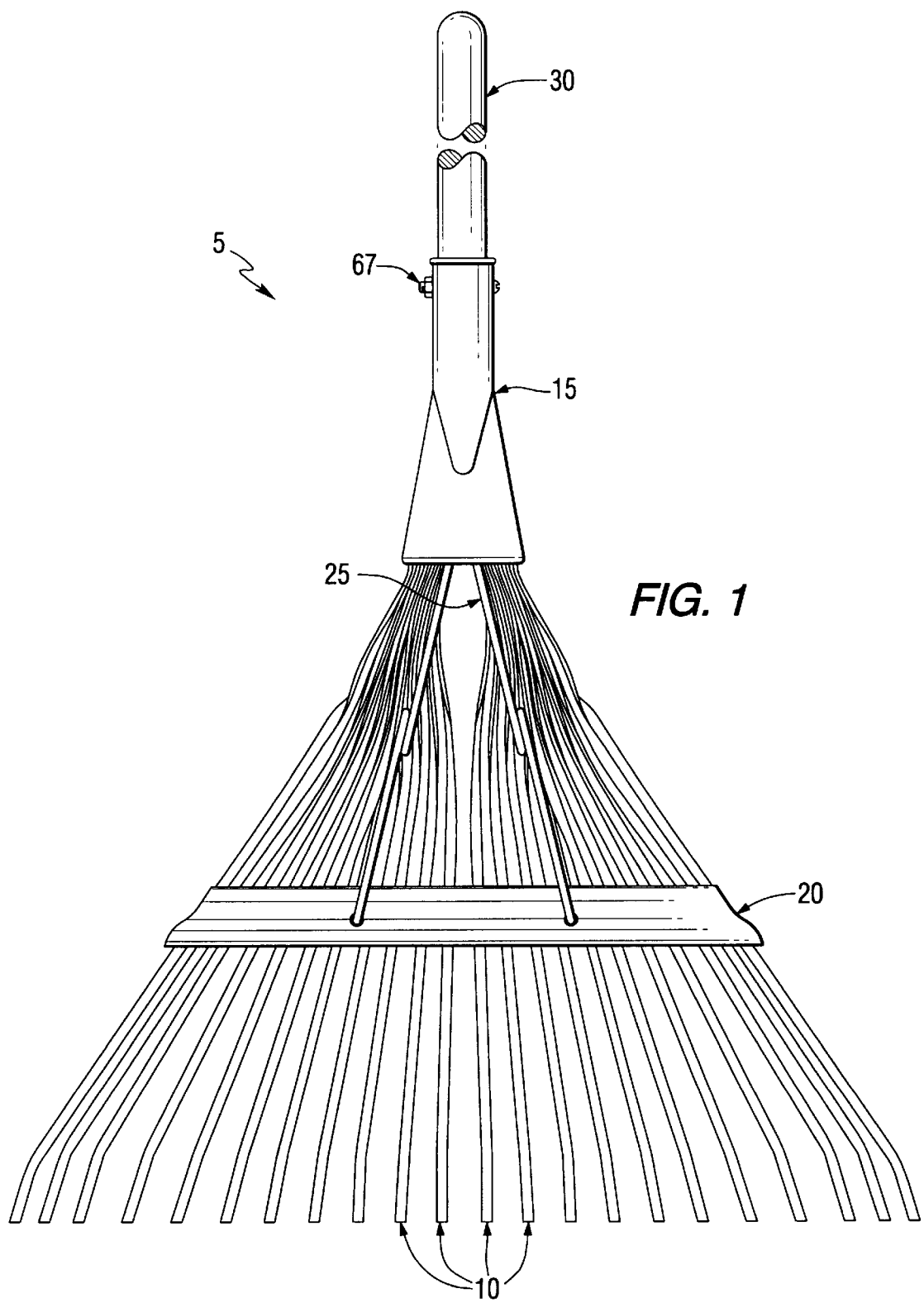
FIG. 1 is a front elevational view of a rake in accordance with the invention.

FIG. 1 illustrates a rake 5 formed in accordance with the invention, comprising a plurality of continuous tines 10, a socket 15, a tine spacer 20, a stiffening spring 25, and a handle 30. More particularly, and referring to FIGS. 2–7, each tine 10 comprises an elongated flexible strip or beam of metal, such as spring steel or the like. The continuous paired tines 10 have a rectangular cross-section including an outer flat surface 35, an inner flat surface 40, two narrow side edges 43, and two terminal ends 45. Other cross-sections are also viable for use in the invention. The tines can be cut from flat strip stock or the like.

Figure 2:
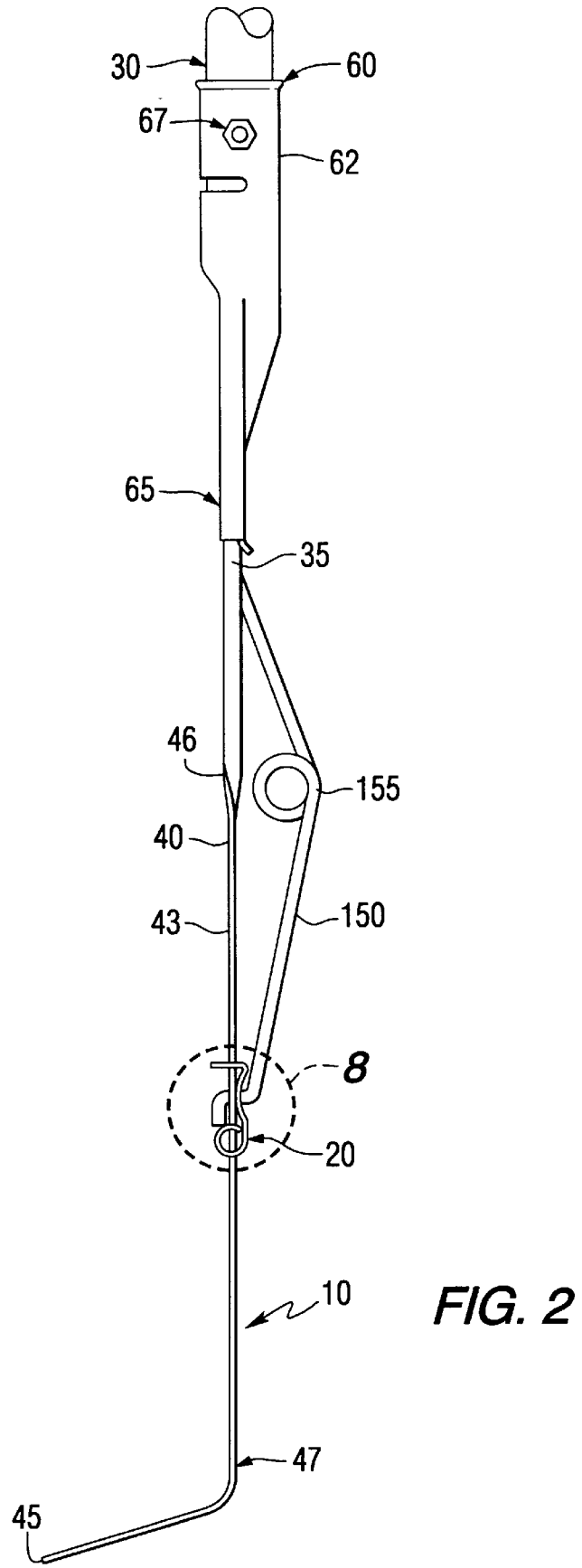
FIG. 2 is a side view of the rake shown in FIG. 1, with the handle broken away for clarity of illustration.

Each continuous paired tine 10 has two twisted portions or twists 46 that are spaced from one another along the length of the tine strip, and create two distinct orientations of the strip. More particularly, portions 47 of tines 10 are disposed between terminal ends 45 and each twist 46 (FIG. 2). Portions 49 are disposed between the two twists 46 (FIG. 7). Twists 46 rotate portions 47 of each tine 10 by approximately 90° about the longitudinal axis of the tine so that each portion 47 is oriented substantially perpendicular to portion 49.

Figure 3:
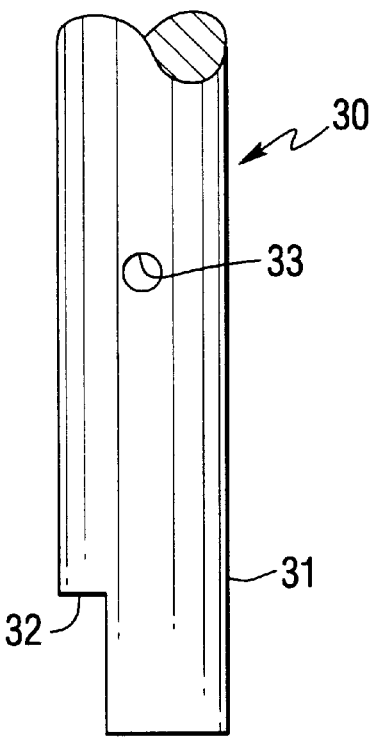
FIG. 3 is a broken away side elevational view of the mating end of the handle shown in FIG. 1.
Figure 4:
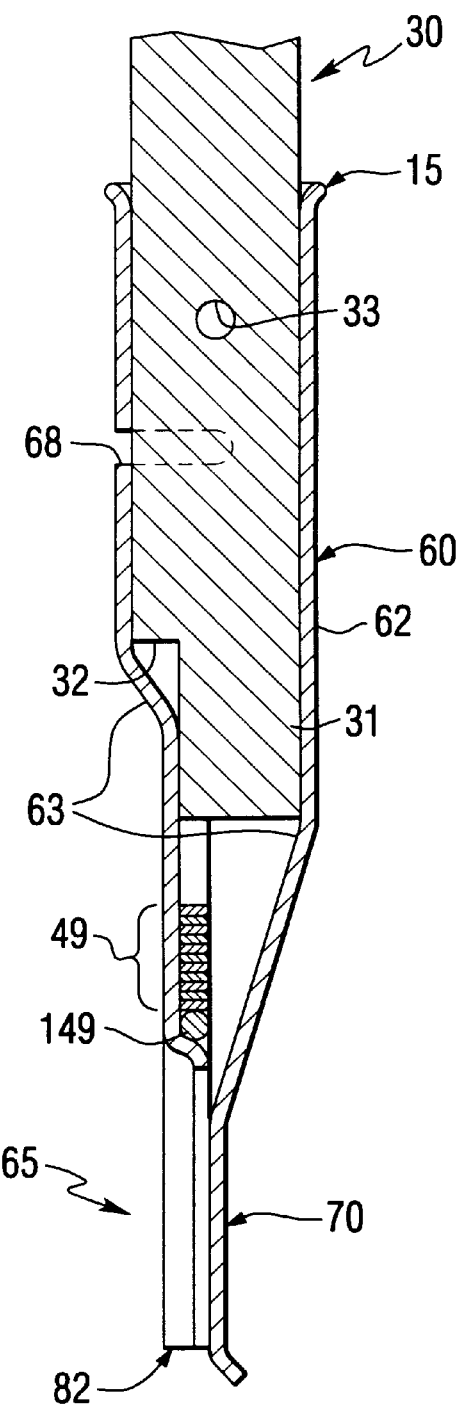
FIG. 4 is a sectional view of the socket and handle shown in FIG. 1.

Referring to FIGS. 1–7, socket 15 is formed from a durable malleable metal, such as steel or the like, and comprises a first end 60 and second end 65 (FIG. 2). First end 60 forms a substantially cylindrical tube 62 that receives and is fixedly fastened to the end of handle 30. As shown in FIGS. 3 and 4, handle 30 can comprise a notched end 31 forming a shoulder 32. A transverse bore 33 through handle 30 receives a fastener adjacent to notched end 31, passed through corresponding holes in tube 62. The notched end and fastener affix the handle against rotation in the tube as well as mechanically attaching socket 15 and handle 30. Bore 33 is sized to accept nut and bolt arrangement 67 for fastening handle 30 to tube 62, as shown in FIGS. 1 and 2. A slotted recess 68 may also be transversely defined through first end 60 to allow for variations in the cross-sectional dimensions of handle 30. Tube 62 narrows as it extends toward second end 65 to form an offset swaged portion 63 at the transition between first end 60 and second end 65 (FIG. 4).

Figure 5:
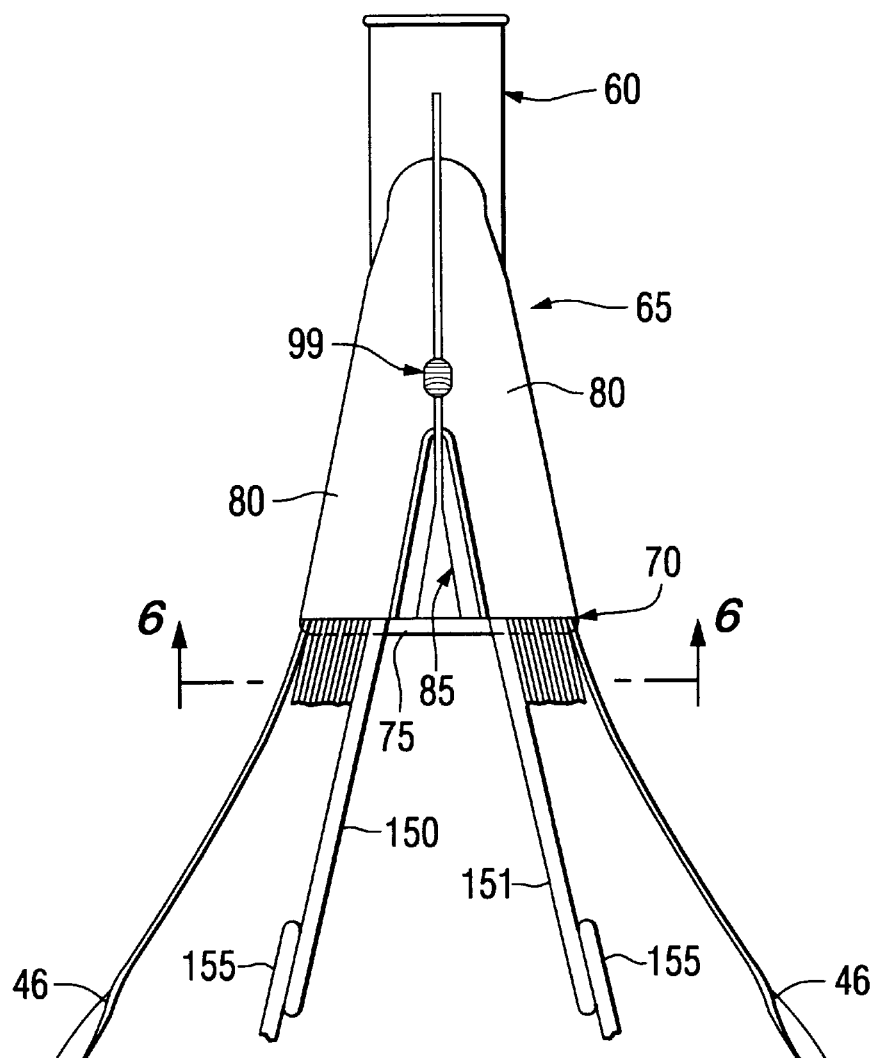
FIG. 5 is a broken-away top view of the rake shown in FIG. 1.
Figure 6:
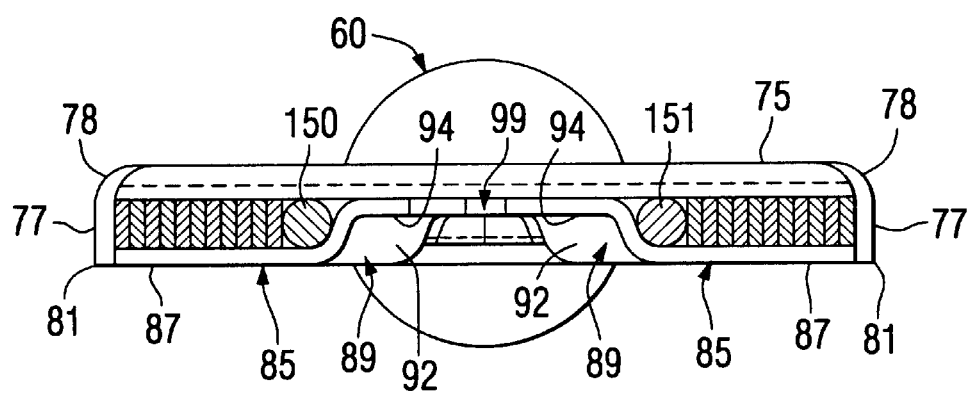
FIG. 6 is an end view of the rake shown in FIG. 5, as taken along line 6—6 in FIG. 5.

Referring to FIGS. 5 and 6, the second end 65 of socket 15 comprises a crimpable tine receptacle 70 including a base 75, two side walls 77, two cover walls 80, and two crimp wings 85. Base 75 comprises a substantially flat plate having a generally frusto-conical shape, best seen in FIGS. 1 and 5. The narrowest portion of base 75 intersects with offset swaged portion 63 of first end 60. Side walls 77 are joined to base 75 along a common edge or bend line indicated generally by reference numeral 78 in FIG. 6. Each cover wall 80 is joined to a side wall 77 along a common edge or bend line indicated at 81 in FIG. 6. Cover walls 80 are coplanar with one another and in spaced parallel relation with base 75. As a result, tine receptacle 70 forms a frusto-conical hollow case having an opening 82 (FIG. 4) adapted to receive a stack of paired tines 10, as will hereinafter be disclosed in further detail.

Each cover wall 80 includes a crimp wing 85 disposed at an outer or wider end of tine receptacle 70, adjacent to opening 82. Each crimp wing 85 comprises a clamp portion 87 and a flange 89. Each clamp portion 87 is longitudinally contiguous with a cover wall 80 and shares common edge or bend line 81 with a side wall 77. In a preassembled form, flanges 89 are coplanar and in confronting relation to base 75. However, each flange 89 is crimped downwardly, toward base 75, during the assembly of rake 5, so that a first portion 92 projects away from the plane of each clamp portion 87 and a second portion 94 is disposed in parallel relation to clamp portion 87 and engages an inner surface of base 75 (FIGS. 5 and 6). Cover walls 80 each comprise a semicircular recess forming an inwardly protruding dimple 99, that is formed during the assembly of rake 5, as discussed below.

Figure 9:
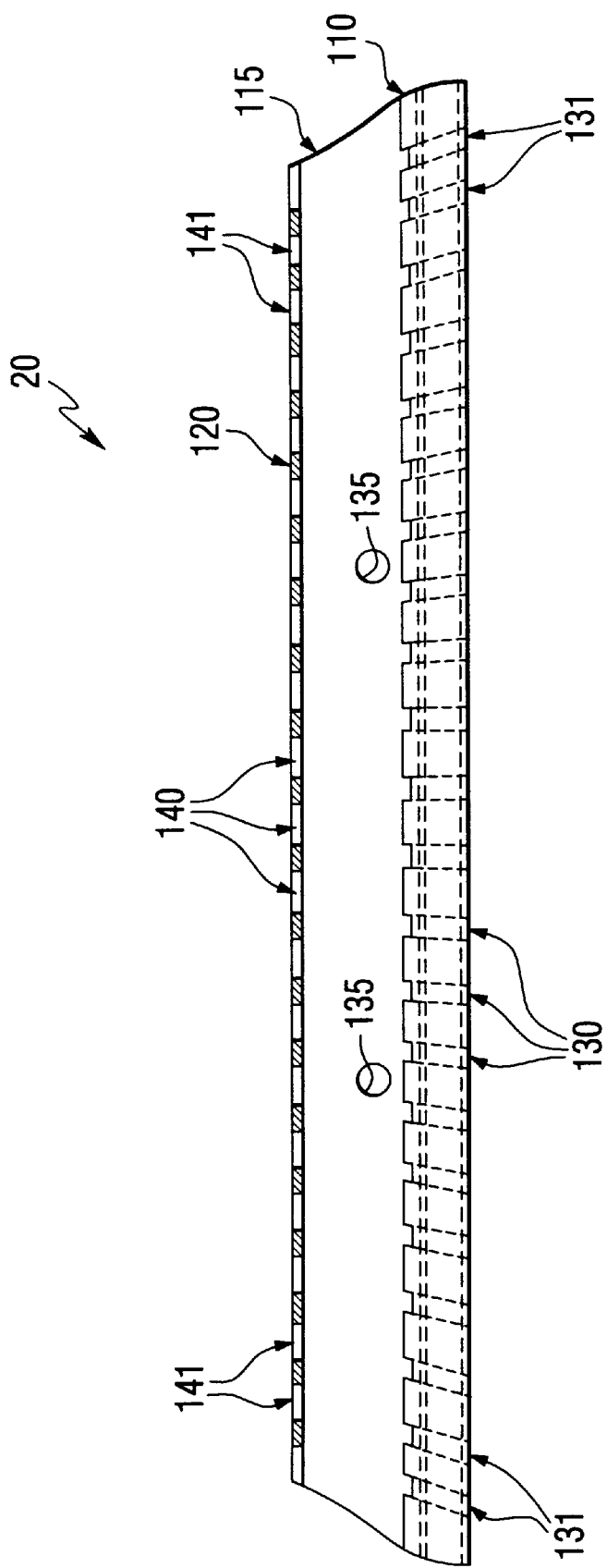

Referring to FIGS. 1–2, and 8–9, tine spacer 20 comprises a substantially tubular portion 110, a curved-flange 115 and a guide-flange 120. Tine spacer 20 is formed from an integral strip of metal, such as spring steel or the like. One edge of tine spacer 20 is beaded over to form a substantially tubular portion 110. A plurality of regularly spaced apertures 130 are defined along the length of tubular portion 110 (FIG. 9). At each end of tine spacer 20 at least a pair of apertures 131 are spaced closer together than apertures 130 to be capable of positioning the outermost of tines 10 closer together than the inner tines. The cross-section of the portion of tubular portion 110 that is removed to form apertures 130 and 131 is rectangular to complement the width of tines 10. Other cross-sections are also possible, preferably also having a width to engage closely around tines 10.

Curved flange 115 projects tangentially from tubular portion 110 and is shaped to provide additional structural stiffness to the rake when assembled. A pair of spaced apertures 135 are provided through curved flange 115. Guide flange 120 extends substantially perpendicular to curved flange 115, forward toward tines 10 (FIG. 8). A plurality of regularly spaced apertures 140 are defined along the length of guide flange 120, which is comb-like and complementary to the tines. The cross-section of the openings in guide flange 120 forming apertures 140 is likewise typically rectangular, of a width corresponding to that of the tines 10. At each end of guide flange 120, at least a pair of apertures 141 are closer together than apertures 140 at the middle of the fan of the rake, to position the outermost of tines 10 closer to one another. As shown in FIG. 8, a solid metal rod 147, e.g., a spring steel wire, is inserted into tubular portion 110 of tine spacer 20 to capture tines 10 in place.

Referring now to FIGS. 1, 2, and 5–8, stiffening spring 25 comprises an elongated rod of spring steel or the like, that is bent around a radius at its mid-point 149 to stack in the same manner as tines 10 (FIG. 7). This forms two spring members 150 and 151. Spring members 150 and 151 are disposed at an approximately 40 to 45 degree included angle relative to the center point of the bend. Each spring member 150, 151 further includes a looped-portion 155 that forms a torsion spring. Each free end 165 (FIG. 8) of spring members 150, 151 comprises a hook 170 adapted for engaging tine spacer 20.

Referring to FIGS. 1–8, rake 5 is assembled as follows. Each tine is first twisted approximately 90° about its longitudinal axis, at two positions along its length, to form the two twisted portions 46. Twists 46 thus divide each tine 10 into 3 portions, i.e., a portion 49 terminated at each end by a twist 46, and two portions 47 that each extend from a twist 46 to a terminal end 45 (FIGS. 2 and 7).

Preferably, ten to twelve of the twisted tines 10 are prepared (i.e., twisted) and assembled together so that their central portions 49 are stacked over one another. In this position, opening 82 of socket 15 is placed adjacent to the stack of tines 10, i.e., directed toward the central portion 49 of the endmost tine 10 in the stack, and oriented to be capable of accepting the stack. Stiffening spring 25 is then placed against the stack of tines on the opposite side from socket 15, so that the mid-point 149 of stiffening spring 25 is adjacent to the central portion 49 of the endmost tine on that side. In a pressing operation, stiffening spring 25 is driven against the stack and toward the socket, thereby bending the tines and the spring at their midpoints, and forcing them tightly and snugly against one another, through opening 82 and into tine receptacle 70 (FIG. 7).

The stack of tines bends to correspond tightly to stiffening spring 25. Dimple 99 is then formed at the intersection between cover walls 80, forward of mid-point 149 of stiffening spring 25. Dimple 99, in the edges of cover walls 80, acts as a stop to retain the stack of tines and stiffening spring 25 within tine receptacle 70 during further operations. For example, dimple 99 retains the spring and tines to allow the tooling used to drive stiffening spring 25 into the stack of tines to be removed from tine receptacle 70 without the spring and tines resiliently backing out. Dimple 99 also contributes to maintaining plurality of tines 10 tightly within socket 15 during normal use of the finished rake.

Once the spring and tines are in position and captive due to dimple 99, flanges 89 of crimp wings 85 are crimped over, around the rounded spring wire shape of spring 25, so that first portion 92 projects downwardly toward base 75 in substantially perpendicular relation to clamp portion 87. At the same time, second portion 94 is maintained in parallel relation to both base 75 and clamp portion 87. Second portion 94 is driven against base 75 so as to bias it slightly thereby storing elastic energy. This further gathers the tines and tightly engages the proximal portion of spring members 150, 151 (FIG. 6). As flanges 89 gather and engage spring members 150, 151, spring members 150, 151 are spread outwardly to the correct spacing for engaging holes 135 in curved flange 115. The endmost captive tine 10 presses against the spring, and the construction acts to rigidly capture the central portions 49 of the plurality of tines 10 between flanges 89 and side walls 77 (FIGS. 6 and 7). At the same time, each clamp portion 87 engages edges 43 of tines 10 to tightly trap the tines in tine receptacle 70 between cover walls 80, clamp portions 87, and base 75. In this way, tine receptacle securely and rigidly fastens to the tines, forming a subassembly comprising tines 10, socket 15, and stiffening spring 25. It will be understood that the crimping of socket 15 over the stack of tines prevents loosening of the tines during use of rake 5 by increasing the structural integrity of this interface. This subassembly is then placed into an appropriately adapted fixture to splay each of the individual tines 10 out into a conventional fan shape.

Tine spacer 20 is fit over the hook ends 170 of spring members 150, 151 and placed over the tines to place tubular portion 110 over portion 47 of each tine 10, with guide-flange 120 disposed toward tine receptacle 70 (FIG. 2). Tine spacer 20 and/or the tines are moved until each tine is captured in apertures 130, 131 and 140, 141. Once in this position, rod 147 is inserted into tubular portion 110, under each of the individual tines 10, to secure tines 10 within tine spacer 20. Rod 147 is crimped at least at two places along its length through apertures 130 to lock it in place.

The tines which are disposed in apertures 131, 141 of tine spacer 20 are held in closer transverse relation to one another to provide additional stiffness to these outer tines, as well as to minimize the likelihood of undue bending and breakage during raking. Advantageously, the twinning of these outer tines by means of apertures 131, 141 of tine spacer 20 provides for an even distribution of the load generated on the tines during raking, leading to a longer life for rake 5.

Once tine receptacle 70 has been crimped to dispose flanges 89 of crimp wings 85 in snug, crimped engagement with respective portions of spring member 150, 151 and tines 10, terminal ends 45 of tines 10 are trimmed and bent so as to form a rake angle at the end of each tine 10. Handle 30 is then inserted into first end 60 of socket 15. More particularly, handle 30 is positioned so that notched end 31 is disposed in coaxial confronting relation with first end 60 of socket 15. Handle 30 is then moved toward first end 60 until shoulder 32 of notched end 31 engages swaged portion 63 of first end 60 (FIG. 4). As this occurs, handle 30 is locked against rotation about its longitudinal axis relative to socket 15. Nut and bolt 67 are then positioned through bore 33 to fasten socket 15 to handle 30 (FIGS. 1 and 2). It will be understood that the combination of nut and bolt 67 disposed through bore 33 and notched end 31 disposed within swaged portion 63 of socket 15 provides an improved resistance to rotation between handle 30 and socket 15.

It is to be understood that the invention is by no means limited to the precise constructions herein disclosed and shown in the drawings, but also encompasses such modifications or equivalents as fall within the scope of the appended claims.

What is claimed is:

1. A rake comprising, in combination:
   a handle;
   a socket having means for retaining said handle disposed at a first end and crimpable means for retaining a plurality of tines disposed at a second end;
   each of said plurality of tines comprising a continuous elongate beam having two terminal ends that are adapted for gathering garden refuse and including two spaced longitudinal twists that divide each tine lengthwise into three portions wherein two end portions are oriented at approximately 90 degrees with respect to a centrally disposed third portion, said plurality of tines being arranged within said second end of said socket so that said third portions are stacked one atop another in contacting relation to adjacent ones of said third portions and said two end portions of each tine extend radially outwardly from said second end of said socket;
   a tine spacer disposed in spaced relation to said socket and assembled to said plurality of tines to form a fan of tines;
   wherein said terminal ends of at least the outer two tines of said fan of tines are disposed in closer transverse relation to one another relative to the others of said terminal ends of said tines, thereby strengthening lateral ends of the fan of tines and stiffening said fan of tines during said gathering.

2. A rake according to claim 1 wherein said handle comprises a first end and a second end, said second end including a notch forming a shoulder on said second end and a bore formed transversely through said handle adjacent to said notch and adapted to receive a bolt for fastening said handle to said socket and further wherein said means for retaining said handle comprises a first end of said socket having a substantially tubular shape having an internal diameter sized to receive said second end of said handle.

3. A rake according to claim 2 wherein said first end of said socket comprises a slot transversely defined therethrough to allow for variations in the cross-sectional dimensions of said handle.

4. A rake according to claim 3 wherein said first end of said socket narrows lengthwise to form a swaged portion.

5. A rake according to claim 1 wherein said crimpable means for retaining said plurality of tines within said second end of said socket comprise a frusto-conically shaped tine receptacle having an opening defined in one side to receive said stack of third portions of said plurality of tines, said tine receptacle comprising a base wall and a cover wall spaced from one another to form a void space sized to receive said stack of third portions of said plurality of tines wherein said cover walls include crimpable portions for engaging said third portions of said plurality of tines to rigidly secure said plurality of tines within said tine receptacle.

6. A rake according to claim 5 wherein said means for stiffening said fan of tines comprises a stiffening spring including two spring members crimped at one end within said means for receiving said plurality of tines and fastened to said tine spacer at another end.

7. A rake according to claim 5 wherein said cover walls further include an inwardly protruding dimple formed adjacent to said means for retaining said plurality of tines and an innermost tine of said stack of tines.

8. A rake according to 6 wherein said stiffening spring comprises at least two free ends adapted for engaging said apertures in said tine spacer.

9. A rake comprising, in combination:
   a handle;
   a socket having means for retaining said handle disposed at a first end and crimpable means for retaining a plurality of tines disposed at a second end;
   each of said plurality of tines comprising a continuous elongate beam including two spaced longitudinal twists that divide each tine lengthwise into three portions wherein two end portions are oriented at approximately 90 degrees with respect to a centrally disposed third portion, said plurality of tines being arranged within said second end of said socket so that said third portions are stacked one atop another in contacting relation to adjacent ones of said third portions and said two end portions of each tine extend radially outwardly from said second end of said socket;
   a tine spacer disposed in spaced relation to said socket and assembled to said plurality of tines to form a fan of tines wherein at least the outer two tines of said fan of tines are disposed in closer transverse relation to one another relative to the others of said two end portions of said tines wherein said tine spacer comprises an integral strip of metal having one edge beaded into a substantially tubular portion comprising a plurality of apertures defined therethrough wherein at least two outer most apertures are disposed in closer spaced-relation relative to other ones of said apertures;
   a curved-flange projecting outwardly in tangential relation to said substantially tubular portion, wherein said curved flange has a pair of spaced apertures therethrough;
   a guide-flange disposed substantially perpendicular to said curved flange and extending along the tubular portion, wherein said curved-flange comprises a plurality of regularly spaced apertures defined along the length of said guide-flange wherein, at least two outer of said apertures are spaced closer together than said regularly spaced apertures to position at least a pair of outermost tines in closer relation to one another than others of said tines; and,
   means for stiffening said fan of tines.

10. A method of assembling a rake comprising the steps of:
   (1) providing a plurality of tines wherein each of said plurality of tines comprises a continuous elongate beam including two spaced-apart longitudinal twists that divide each tine lengthwise into three portions wherein two end portions are cross-sectionally oriented at approximately 90 degrees with respect to a centrally disposed third portion;
   (2) arranging said plurality of tines so that said third portions are stacked one-a-top another in contacting relation, and said two end portions protrude, the plurality of tines forming a fan, and wherein at least two endmost tines on each end of the fan are relatively more closely spaced at terminal ends of their respective said end portions than are tines between said at least two endmost tines on each end of the fan;
   (3) providing a socket having means for retaining a handle disposed at a first end and having crimpable means for retaining said plurality of stacked tines disposed at a second end;
   (4) providing a stiffening spring comprising an elongate rod of spring steel bent at its mid-point about a radius to form two spring members;
   (5) positioning said stiffening spring to place said mid-point bend in contact with an outer most one of said third portions of said stacked tines;
   (6) positioning said stack of tines and said stiffening spring in confronting relation to an opening in said socket sized to receive said third portions of said stack of tines;
   (7) driving said stiffening spring against said stack of tines to bend and form said plurality of tines and thereby forcing said stack of tines within said opening of said socket; and
   (8) crimping said socket to rigidly secure said tines within said socket.

* * * * *